Patented Dec. 31, 1946

2,413,514

UNITED STATES PATENT OFFICE 2,413,514

PREPARATION OF VAT DYESTUFFS OF THE ANTHRAQUINONE SERIES

Melvin A. Perkins, Wilmington, and Paul R. Johnson, Claymont, Del., assignors to E. I. du Pont de Nemours & Company, Wilmington, Del., a corporation of Delaware No Drawing. Application November 5, 1942, Serial No. 464,652

3 Claims. (Cl. 260—265)

This invention relates to an improved process for the preparation of vat dyestuffs of the anthraquinone series, and more particularly to an improved process for the preparation of 3,3'-dichloroindanthrone.

It is generally known to those skilled in the art of anthraquinone vat dye chemistry that N-dihydro-1,2,2',1'-anthraquinone azine, which is commonly called indanthrene or indanthrone and which is a blue dyestuff, is not fast to bleach such as chlorine, peroxide, etc., but that by introducing chlorine or bromine into the molecule its bleach fastness may be greatly improved. It is also known that where two atoms of chlorine are introduced into the indanthrone molecule in the 3,3' positions, a product is obtained which has maximum bleach fastness and sufficient solubility in the vat to render it suitable for use in ordinary vat dyeing operations.

The 3,3'-dichloroindanthrone has been produced by several methods, such as by the condensation of 1-bromo-2-amino-3-chloroanthraquinone; by the condensation of 1,3-dibromo-2-aminoanthraquinone with subsequent replacement of the bromine in the 3,3' position with chlorine; and by direct chlorination of the already produced indanthrone molecule.

By the earlier methods employed in the direct chlorination of indanthrone, it was found that maximum bleach fastness could not be obtained until three or more atoms of chlorine had been introduced into the molecule. In view of the fact that the synthetically prepared 3,3'-dichloroindanthrone exhibited maximum bleach fastness, it was therefore concluded that the halogen in various positions in the indanthrone molecule, other than in the 3,3' position, added nothing to the bleach fastness of the product, and it was early found that this excess chlorine was, in fact, detrimental in the dyeing process. Methods were then perfected for removing the more loosely bound chlorine from the molecule by a vatting process, such as more particularly disclosed in U. S. Patent No. 2,089,009 to Stallmann.

Since it is recognized that the direct chlorination of indanthrone is the cheapest method for producing the 3,3'-dichloroindanthrone, provided it can be produced in the desired purity without complicated or expensive purification methods, a great deal of work has been done in an endeavor to find a process that would give the 3,3'-dichloroindanthrone in high yields and purity by this method.

More recently a process has been devised for chlorinating indanthrone, which gives a product that has bleach fastness substantially equal to that of the synthetically prepared or pure 3,3'-dichloroindanthrone. According to this process the chlorination of the indanthrone is carried out in nitrobenzene in the presence of iron as a catalyst, whereby substantially all of the chlorine introduced is directed to the 3,3' positions, for as pointed out in U. S. Patent 2,205,418, this process gives a product which contains very little loosely bound or extraneous chlorine. While the product obtained according to U. S. Patent 2,205,418 is very suitable for many uses, it has been found that for certain purposes the small amount of extraneous halogen still present is undesirable and should be removed by the controlled vatting process.

While the amount of chlorine present in a product can be determined accurately by analysis, the positions of the chlorine in the indanthrone molecule could be determined only by comparing a given product with 3,3'-dichloroindanthrone of known purity in respect to bleach fastness and loss of chlorine when subjected to the low temperature vatting process of Stallmann U. S. Patent 2,089,009. Heretofore when a dichloroindanthrone which contained two atoms of chlorine exhibited bleach fastness equal to that of synthetically prepared 3,3'-dichloroindanthrone, and the chlorine content was not substantially reduced when vatted by the process of U. S. Patent 2,089,009, the product was considered to be of high purity.

We have found that when pure 3,3'-dichloroindanthrone is crystallized from 85% sulfuric acid, it is obtained in the form of well defined rectangular prisms, while trichloroindanthrone crystallizes from acid of similar strength in needle-like crystals. We have also found that when 3,3'-dichloroindanthrone is mixed with, or contains, even as little as 2% of trichloro- or higher chlorinated bodies, the 3,3'-dichloroindanthrone has the crystal form of the trichloroindanthrone imposed upon it and the entire mass crystallizes out in needle-like crystals. In checking up on products that have exhibited some undesirable dyeing properties but which by previous methods of identification appeared to be quite pure 3,3'-dichloroindanthrone, we have found that they contain material quantities of trichloroindanthrone. Since by analysis these products appear to contain only two atoms of chlorine, it is obvious that they must therefore contain some monochloroindanthrone.

Since no methods have been devised for separating trichloroindanthrone from dichloroindanthrone, and since the vatting step to knock off extraneous chlorine adds materially to the cost of the process, it was desirable that a process should be developed whereby indanthrone could be dichlorinated without any over-chlorination.

It is therefore an object of this invention to provide a simple and economical process for chlorinating indanthrone to the 3,3'-dichloroindanthrone stage without the production of any higher chlorinated bodies in the product.

It is a further object of the invention to provide a process for separating the 3,3'-dichloroindanthrone from any monochloroindanthrone that may be present in the chlorination mass, whereby 3,3'-dichloroindanthrone of high purity may be economically obtained by the direct chlorination of indanthrone.

We have found that 3,3'-dichloroindanthrone of high purity, which is free from trichloroindanthrone and higher chlorinated indanthrone bodies, can be prepared by direct chlorination of indanthrone when the chlorination is carried out with sulfur dichloride. The chlorination is preferably carried out in an inert organic solvent or with the sulfur dichloride itself acting as the reaction medium. The chlorination may be carried out at temperatures of from 20° to 150° C., without producing any trichloroindanthrone in the mass. No catalysts are required, and the dichloroindanthrone is obtained directly as the N-dihydroanthraquinone azine without the formation of the azine or azhydrine forms. The reaction is preferably carried out in glass, enamel, nickel or other vessel which does not contain free iron, for in the presence of free iron or iron salts the chlorination does not proceed to the dichloroindanthrone stage in a satisfactory manner. When the reaction is carried out in an inert organic solvent or in the sulfur dichloride itself, the dichloroindanthrone precipitates as it is formed, in quite large crystals which apparently occlude some of the incompletely chlorinated material, so that in the final product substantial amounts of monochlorindanthrone are present which must be separated from the dichloroindanthrone, for otherwise the resulting product will be deficient in bleach fastness.

We have found that the dichloroindanthrone may be readily separated from the monochloroindanthrone by dissolving the crude product in concentrated sulfuric acid and slowly reducing the acid concentration of the solution to from 85% to 90% while the temperature is maintained at from 25° to 150° C., and preferably 90° to 100° C.

The following examples are given to illustrate the invention.

*Example 1*

Ten parts of indanthrone (N-dihydro-1,2,1',2'-anthraquinone azine) are suspended in 150 parts of nitrobenzene. The mass is brought to a temperature of from 80° to 130° C., and 5 to 15 parts of sulfur dichloride are added over a period of from two to twelve hours. The reaction mixture is held at the reaction temperature for an additional twelve to eighteen hours, or until a dyeing of the reaction product is as fast to bleach as 3,3'-dichloroindanthrone. The product is isolated by any of the usual methods, such as by filtering and washing the filter cake with nitrobenzene, then steam distilling the cake with the addition of a small amount of sodium sulfide and soda ash. The steam distilled product is then filtered and washed alkali-free with water, and dried. The product is 3,3'-dichloroindanthrone containing a small amount of monochloroindanthrone, but being entirely free of trichloroindanthrone.

In the above example, if desired, the sulfur-dichloride may be added in a single portion to the reaction mixture at 20° to 30° C. The reaction mass is then heated slowly to the desired reaction temperature, and the process is continued as described in the example.

*Example 2*

Ten parts of indanthrone are suspended in 100 to 140 parts of ortho-dichlorobenzene. The mass is brought to a temperature of 130°–140° C., and from 9 to 14 parts of sulfur-dichloride are added over a period of one-half to twelve hours. The reaction is allowed to proceed for an additional three to twelve hours, or until a test dyeing of the product shows it to be fast to bleach. The product may be isolated by any of the usual methods, one of which is illustrated in Example 1. It is similar to the product of Example 1 in all respects.

*Example 3*

Ten parts of the product of Example 1 are dissolved in 100 parts of concentrated sulfuric acid (96% to 100%). The solution is heated to from 90° to 100° C. and held at this temperature while sufficient water to dilute the acid to 85% strength is added slowly over a period of one-half hour or longer. The mixture is held on temperature for some time after the dilution is complete. It is then allowed to cool to room temperature. The mass is filtered and the cake is washed with 50 parts of 85% sulfuric acid. The cake is then slurried in water, filtered, washed free of acid, and dried. The product is entirely in the form of small rectangular prisms, or cubes, and contains none of the needle-like crystals characteristic of the presence of trichloroindanthrone derivatives. It is 3,3'-dichloroindanthrone of high purity, and is identical in all respects to the material described by U. S. Patent 2,056,593. The yield of product varies from 75% to 90%, depending upon the chlorine content of the product of Example 1.

In this example, from 50 to 100 parts of concentrated sulfuric acid may be employed to dissolve the chlorinated indanthrone, and the acid may be of a concentration ranging from 91% to 100%. To precipitate the 3,3'-dichloroindanthrone, the solution should be diluted to bring the concentration within the range of from 85% to 88%.

*Example 4*

Ten parts of the product of Example 1 are added to 100 parts of 90% sulfuric acid. The mixture is heated to 90°–100° C. and held at this temperature with stirring for a period of thirty to sixty minutes. During this time the color, which is only partially soluble in sulfuric acid of this concentration, is converted from the needle-like form of the crude product to the prismatic form of the purified product. When the conversion is complete, as shown by examination under the microscope, sufficient water is added over a period of thirty minutes to dilute the acid to 88% strength. The mixture is allowed to cool to room temperature, and is then filtered, washed and otherwise treated as in Example 3. The product is similar to that of Example 3 in all respects.

The concentration of the sulfuric acid employed in this example should be within the range of from 87% to 91%, for in acid of this concentration the dichloroindanthrone has only limited solubility but the solubility is sufficient for the needle-like crystals of the chlorinated product, which result from crystallization from the nitrobenzene in which it is formed to be converted to the prismatic crystals with the monochloroindanthrone present in the mass going into solution in the sulfuric acid. Upon dilution of this sulfuric acid mass, the concentration should be brought to not less than 85%, and preferably to from 87% to 88%. The temperature at which the crystallization is allowed to occur may vary from 25° to 150° C. The preferred range is from 90° to 100° C.

*Example 5*

The 85% sulfuric acid filtrate of Example 3 is poured into water. The resultant precipitate is filtered, washed free of acid, and dried. The product, a mono-chloroindanthrone, is obtained in yields of 10% to 25%, and contains about 7% to 8% of chlorine.

The mono-chloroindanthrone may be further purified by subjecting it to crystallization from sulfuric acid. It crystallizes in small greenish needles. After being washed free of sulfuric acid and thoroughly dried, the product is found to contain 7.41% chlorine and 5.83% nitrogen. The theoretical values for mono-chloroindanthrone are 7.46% chlorine and 5.90% nitrogen. The product when dyed on cotton is similar in shade and fastness properties to the mono-chloroindanthrone made by other methods, such as the addition of HCl to 2,1,1',2'-anthraquinone azine (Scholl).

The chlorination of the indanthrone may be carried out in any organic solvent which is inert under the conditions employed, such as nitrobenzene, nitrotoluene, trichlorbenzene, etc. Where sulfur dichloride itself is employed as the reaction medium, the reaction is preferably carried out at temperatures of from 25° to 40° C. The chlorinated indanthrone may be isolated by filtering, and washing the filter cake with an organic solvent, such as benzene, to free it from sulfur dichloride.

The mono-chloroindanthrone remaining in the sulfuric acid filtrate may be isolated, as in Example 5, or it may be isolated by diluting the acid to approximately 70% strength and filtering. The recovered mono-chloroindanthrone may be returned to the process for further chlorination to the dichloroindanthrone.

The mechanism of the chlorination reaction is not fully understood. Since chlorination of the indanthrone beyond the dichloro stage does not occur even in the presence of a large excess of the sulfur dichloride, it is believed that the reaction takes place through the formation of an intermediate addition complex involving one molecule of indanthrone and two molecules of sulfur dichloride. Since complete dichlorination is difficult, the dichloroindanthrone must be separated from the partially chlorinated product, preferably by the process as above described.

The present process offers the following advantages, over the previously described processes, for the direct chlorination of indanthrone:

1. A careful control of the reaction with regard to temperatures, time and amount of chlorinating agent employed is not required in the present process, for over-chlorination is not effected even at the higher temperatures.
2. No catalysts are required.
3. The dichloroindanthrone is obtained directly in the N-dihydro form, making it unnecessary to carry out, as a final step, the reduction of the azines or azhydrines ordinarily produced in the direct chlorination of indanthrone.
4. The dichloroindanthrone obtained is entirely free of higher chlorinated bodies, and therefore need not be subjected to a vatting procedure to remove even traces of the undesirable extraneous chlorine.

We claim:

1. In the process of producing 3,3'-dichloroindanthrone, the steps which comprise carrying out the chlorination of indanthrone with sulfur dichloride as the chlorinating agent at temperatures of from 20° to 150° C., dissolving the resulting chlorinated product in concentrated sulfuric acid, precipitating the 3,3'-dichloroindanthrone by reducing the acid concentration to from 85% to 88%, and separating the precipitated 3,3'-dichloroindanthrone from the sulfuric acid solution of the remaining impurities.

2. In the process for preparing 3,3'-dichloroindanthrone by direct chlorination of indanthrone wherein some mono-chlorinated material is to be separated from the dichloroindanthrone but wherein no trichloroindanthrone is present, the steps which comprise dissolving the chlorination mass in concentrated sulfuric acid, precipitating the 3,3'-dichloroindanthrone by reducing the acid concentration to from 85% to 90% and separating the precipitated 3,3'-dichloroindanthrone from the acid solution of the impurities.

3. In the process for preparing 3,3'-dichloroindanthrone by direct chlorination of indanthrone wherein some monochlorinated material is to be separated from the dichloroindanthrone but wherein no trichloroindanthrone is present, the steps which comprise dissolving the chlorination mass in concentrated sulfuric acid, precipitating the 3,3'-dichloroindanthrone by reducing the acid concentration to from 87% to 88% and separating the precipitated 3,3'-dichloroindanthrone from the acid solution of the impurities.

MELVIN A. PERKINS.
PAUL R. JOHNSON.